3,154,538
PROCESS FOR HYDROGENATING NITROSAMINES

Daniel A. Lima, Glen Burnie, Md., assignor to FMC Corporation, New York, N.Y., a corporation of Delaware
No Drawing. Filed Mar. 9, 1962, Ser. No. 178,563
5 Claims. (Cl. 260—239)

This invention relates to an improved process for the hydrogenation of N-nitrosamines to form N,N-disubstituted hydrazines.

One process which is currently employed for converting N-nitrosamines to N,N-disubstituted hydrazines is carried out by hydrogenating the N-nitrosamines in the presence of a catalyst such as palladium. In the case of producing N,N-disubstituted hydrazines, the catalytic hydrogenation takes place according to the following equation:

Equation 1

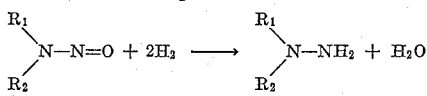

where $R_1$ and $R_2$ are alkyl groups or members of a heterocyclic ring.

One serious difficulty that has arisen in carrying out this process is the diminished yields of N,N-disubstituted hydrazine which are obtained because of side reactions which occur along with the principal catalytic hydrogenation. The two principal side reactions which occur are:

Equation 2

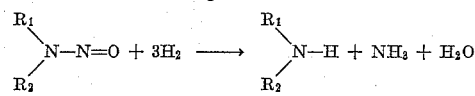

Equation 3

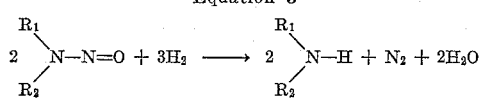

The conversion of the N-nitrosamine to the corresponding secondary amine is undesirable because it decreases the yield of N,N-disubstituted hydrazine product which can be obtained from a given quantity of N-nitrosamine. In addition, the secondary amine must be separated from the hydrazine product. This is done by removing the more volatile amine by distillation and leaving the hydrazine product as residue. Increased quantities of amine by-product prolong this separation and contribute to loss of the desired hydrazine product during distillation.

The formation of the amines is also undesirable because it has the effect of poisoning the palladium catalyst. Accordingly, production of a higher mole ratio of hydrazine to amines is desirable in order to increase the life of the palladium catalyst.

It has been proposed to increase the rate of the principal reaction, as defined in Equation 1, by the use of iron compounds in the manner set forth in U.S. Patent 2,979,505, issued April 11, 1961 to W. B. Tuemmler et al. These iron compounds have been found to increase the rate of reaction of N-nitrosamines, as well as the mole ratio of N,N-disubstituted hydrazines to amines recovered in the product mixture. However, these compounds have not been found sufficiently selective to increase the mole ratio of N,N-disubstituted hydrazines to amines to desirably high values. As a result, there is a need for more selective additives which will yield higher mole ratios of N,N-disubstituted hydrazines to amines in order to prevent substantial portions of the N-nitrosamine feed from being converted to undesirable side products.

It is an object of the present invention to provide an improved process for the catalytic hydrogenation of N-nitrosamines to form N,N-disubstituted hydrazine in which the mole ratio of the hydrazine to amine side products which are produced is substantially increased.

These and other objects will be apparent from the following disclosure.

It has been found in the process of producing N,N-disubstituted hydrazine by catalytic hydrogenation of N-nitrosamines that the undesirable overhydrogenation of the nitrosamine to form secondary amine side products can be markedly reduced by carrying out the catalytic hydrogenation in the presence of (a) a soluble iron salt in amounts sufficient to provide about 0.1 to about 2 millimoles of iron per gram of catalyst and (b) a compound having a cation selected from the group consisting of the alkali metals and the alkaline earth metals, and an anion which yields hydroxide ions in the solution of nitrosamines being hydrogenated, said compound being present in the mole ratio of from 2.5:1 to 50:1 of said soluble iron salt and in amounts to provide at least about 2.5 millimoles of hydroxide ion per gram of catalyst.

These two additives act synergistically to inhibit the overhydrogenation of the nitrosamine to the secondary amine.

Catalytic reduction in the present process is carried out by dissolving the nitrosamine feed in a suitable solvent for carrying out the reaction. The preferred solvent is water, although alcohol or other organic solvents may be employed. The solution of nitrosamine is then passed into a hydrogenator which contains the catalyst and means for introducing hydrogen gas. The catalyst employed is generally palladium supported on an inert carrier such as active carbon, alumina, calcium carbonate or other similarly insoluble material. Hydrogen gas is passed into the hydrogenator under superatmospheric pressure. The catalytic hydrogenation is generally carried out at temperatures between about 20° and 100° C.

The concentration of the palladium metal on the inert carrier may vary from 0.1% to as high as 10%. A catalyst containing about 5% palladium supported on an active carbon has been found quite suitable. The two additives can be added to the reaction system in any convenient manner. The preferred method is to add the additives directly to the aliphatic nitrosamine solution prior to hydrogenation. However, the additives may be introduced into the reaction system by incorporating them in the catalyst at the time of catalyst preparation. The manner of introduction of these additives is immaterial, provided that both are present during the hydrogenation of the nitrosamines.

The iron salt component which is added to the system may be in the form of either ferrous or ferric compounds. In most cases, it is advantageous to select the iron salt on the basis of its solubility in the solvent used as the reaction medium. The preferred concentration of the iron salt corresponds to about 0.5 to about 1 millimole of iron per gram of palladium catalyst. Smaller amounts, even as little as 0.1 millimole, have an effect.

The hydroxide yielding compound may contain as the cation either alkali or alkaline earth metals such as lithium, sodium potassium, magnesium, calcium, strontium or barium. The preferred compounds have hydroxide anions, e.g., NaOH, KOH. However, salts of alkali or alkaline earth metals composed of anions which are capable of being reduced or hydrolyzed to a metal hydroxide under the selected conditions within the hydrogenator can be employed. Examples of compounds which can be reduced in this manner are sodium nitrate and sodium nitrite.

These materials are reduced to sodium hydroxide according to the following equations:

EQUATION 4

$$NaNO_3 + 4H_2 \rightarrow NaOH + NH_3 + 2H_2O$$

EQUATION 5

$$NaNO_2 + 3H_2 \rightarrow NaOH + NH_3 + H_2O$$

An example of a compound which can be hydrolyzed and which is suitable is sodium carbonate ($Na_2CO_3$). This compound reacts as follows:

EQUATION 6

$$Na_2CO_3 + H_2O \rightleftharpoons NaHCO_3 + NaOH$$

The hydroxide-yielding compound must be present in the mole ratio of about 2.5:1 to 50:1 of the iron salt employed. Amounts of hydroxide-yielding compounds as low as 2.50 millimoles per gram of catalyst have been found effective. Larger amounts as high as 25 millimoles of salt per gram of catalyst have also been found suitable.

The mechanism by which these additives effect the reaction is not completely understood. However, it is known that they act synergistically. That is, the two substances in combination show an unexpected result beyond the mere cumulative results of the two individual additives when used alone. By means of these additives, the mole ratio of hydrazine to amine by-products in the final reaction product is increased from about 8 to as high as 90.

The following examples are presented by way of illustration only and are not deemed to be limiting to the invention.

EXAMPLE I

A series of runs was made to study the effect of various salts in the presence and absence of ferrous sulfate on the hydrogenation of nitrosodimethylamine. The reaction mixture was composed of 100 ml. of 56 percent of nitrosodimethylamine in water and one gram of catalyst composed of five parts palladium supported on 95 parts active carbon. Where iron and other salts were used, they were added directly to the aqueous reaction mixture prior to hydrogenation. The catalytic hydrogenation was conducted in a Parr hydrogenation apparatus at 55° C. under a hydrogen pressure of about 40 to 50 lbs. per square inch gauge. The reaction was observed by noting the decrease in pressure and was continued until hydrogen uptake reached at least 93% of theory, unless otherwise noted. The time at which 50% of the theoretical hydrogen was consumed was read from a graph in which pressure drop was plotted against time. The product mixtures were analyzed with a gas phase chromatograph to determine the amounts of N,N-dimethylhydrazine (DMH) product and N,N-dialkylamine side product. The specific salts which were employed and the results obtained are given in Table I.

Table I

| Run | Salt | Millimoles Salt | Millimoles FeSO$_4$ | 50% Reaction, Min. | Yield, Percent DMH | Mole ratio, DMH/ amines |
|---|---|---|---|---|---|---|
| 1 | | | 1.0 | 38 | 80.5 | 8.1 |
| 2 | | | 1.0 | 49 | 81.9 | 7.5 |
| 3 | | | | 85 | 75.5 | 5.0 |
| 4 | NaNO$_3$ | 11.8 | | a 250 | 63.4 | 6.2 |
| 5 | CaCl$_2$ | 11.8 | | 164 | 68.9 | 5.0 |
| 6 | NaOH | 11.8 | | b 320 | 38.6 | 5.5 |
| 7 | NaNO$_2$ | 11.8 | | c 411 | 32.5 | 4.0 |
| 8 | Na$_2$SO$_4$ | 11.8 | 1.0 | 50 | 83.7 | 9.4 |
| 9 | Al$_2$(SO$_4$)$_3$ | 11.8 | 1.0 | 106 | 53.3 | 4.5 |
| 10 | NaNO$_3$ | 11.8 | 1.0 | 57 | 90.0 | 19.0 |
| 11 | NaNO$_3$ | 11.8 | 1.0 | 38 | 95.1 | 17.5 |
| 12 | NaNO$_2$ | 11.8 | 1.0 | 48 | 98.2 | 35.1 |
| 13 | Na$_2$CO$_3$ | 11.8 | 1.0 | 85 | 90.5 | 20.6 |
| 14 | NaOH | 5.0 | 1.0 | 56 | 98.9 | 41.0 |
| 15 | NaOH | 5.0 | 1.0 | 57 | 98.8 | 38.0 |
| 16 | NaOH | 10.0 | 1.0 | 82 | 95.1 | 90.0 | a Reaction stopped at 65 percent of theoretical hydrogen uptake.
b Reaction stopped at 40 percent of theoretical hydrogen uptake.
c Reaction stopped at 36 percent of theoretical hydrogen uptake.

EXAMPLE II

A second series of runs was carried out in the same manner as Example I, in which varying amounts of both sodium hydroxide and ferrous sulfate were employed. The specific amounts of salts employed and the results obtained are reported in Table II.

Table II

| Run | Millimoles NaOH | Millimoles FeSO$_4$ | 50% Reaction, Min. | Yield, Percent DMH | Mole ratio, DMH/ amines |
|---|---|---|---|---|---|
| 1 | | 1.0 | 36 | 86.5 | 8.6 |
| 2 | 5.0 | 1.0 | 46 | 97.7 | 25.0 |
| 3 | 5.0 | 0.1 | 55 | 94.2 | 30.0 |
| 4 a | 5.0 | 0.01 | 306 | 55.0 | 6.5 |
| 5 | 0.5 | 0.1 | 150 | 81.4 | 7.9 |
| 6 | 0.05 | 0.01 | 57 | 87.0 | 8.8 |
| 7 | 25.0 | 1.0 | 121 | 97.4 | 33.9 |
| 8 | 5.0 | 3.0 | 44 | 88.0 | 10.0 | a Reaction stopped at 60 percent of theory.

EXAMPLE III

Two runs were carried out in the same manner as Example I, except that the concentration of the nitrosodimethylamine was increased to 65%. The results of these runs are given in Table III.

Table III

| Run | Millimoles NaNO$_3$ | Millimoles FeSO$_4$ | 50% Reaction, Min. | Yield, Percent DMH | Mole ratio, DMH/ amines |
|---|---|---|---|---|---|
| 1 | | 1.0 | 74 | 77.8 | 7.0 |
| 2 | 11.8 | 1.0 | 50 | 95.0 | 18.9 |

The effect of various alkali and alkaline earth metal hydroxides on overhydrogenation was obtained by carrying out six runs in the same manner as Example I. In each of these runs, 1.0 millimole of ferrous sulfate was employed. The specific hydroxides employed and the results which were obtained are tabulated in Table IV.

Table IV

| Run | Hydroxide | Millimoles | 50% Reaction, Min. | Yield, Percent DMH | Mole ratio, DMH/ amines |
|---|---|---|---|---|---|
| 1 | | | 38 | 80.5 | 8.1 |
| 2 | NaOH | 5 | 56 | 98.9 | 41.0 |
| 3 | Ca(OH)$_2$ | 5 | 100 | 89.9 | 31.0 |
| 4 | Mg(OH)$_2$ | 5 | 49 | 85.3 | 11.7 |
| 5 | LiOH | 5 | 55 | 89.9 | 26.0 |
| 6 | KOH | 5 | 55 | 98.2 | 40.1 |

Of these hydroxides, it is noted that magnesium hydroxide was not as effective in suppressing over-reduction as were the other hydroxides. This is believed due to the low solubility of magnesium hydroxide in the reaction medium, i.e., water.

EXAMPLE V

Five runs were carried out as described in Example I in which varying amounts of sodium hydroxide were employed in each run, with 1.0 millimole of ferrous sulfate being employed. The results obtained are listed in Table V.

Table V

| Run | Millimoles NaOH | 50% of Reaction, Min. | Yield, Percent DMH | Mole ratio, DMH/ amines |
|---|---|---|---|---|
| 1 a | 0.00 | 50±10 | 80.5–85.6 | 7.9±.5 |
| 2 | 1.25 | 60 | 86.5 | 13.8 |
| 3 | 2.50 | 61 | 91.5 | 21.0 |
| 4 | 5.00 | 56 | 98.0 | 39.5 |
| 5 | 10.00 | 117 | 97.9 | 45.5 | a These data are the average of five runs made during the entire course of the work.

EXAMPLE VI

In order to demonstrate the reduction of sodium nitrate and sodium nitrite to yield a base, the following procedure was employed.

Four runs were carried out with solutions containing 11.8 millimoles of a salt, as specified in Table VI, dissolved in 100 ml. of water. The solutions thus obtained were treated with hydrogen over 1.0 gram of palladium catalyst for 30 minutes. The resulting solutions contained ammonia and sodium hydroxide. The concentration of total base was determined by titration with standard acid to a methyl red end point. The odor of ammonia was evident in the reaction mixtures. Evaporation of an aliquot of product mixture from Run 3 resulted in a non-volatile residue containing 8.1 milliequivalents (69% yield) of sodium hydroxide. The results of the four runs are given in Table VI.

Table VI

| Run | Millimoles $FeSO_4$ | Millimoles $NaNO_2$ | Millimoles $NaNO_3$ | Millimoles of Total Base | Conversion [a], percent |
|---|---|---|---|---|---|
| 1 | 1 | 11.8 | | 15.6 | 66 |
| 2 | 0 | 11.8 | | 15.6 | 66 |
| 3 | 1 | | 11.8 | 18.2 | 77 |
| 4 | 0 | | 11.8 | 18.2 | 77 |

[a] Based on theoretical yield of 23.6 millimoles of base according to equations (4) and (5).

EXAMPLE VII

Two runs were carried out in the same manner as Example I, except that nitrosohexamethyleneimine was employed in a concentration of 51.2%. The results of these runs are given in Table VII.

Table VII

| Run | Millimoles NaOH | Millimoles $FeSO_4$ | 50% Reaction, Min. | Yield, percent N,N-disubstituted Hydrazine | Mole ratio N,N-disubstituted Hydrazine/amines |
|---|---|---|---|---|---|
| 1 | | 0.1 | 102 | 78.0 | 5.3 |
| 2 | 5 | 0.1 | 115 | 85.0 | 14.7 |

EXAMPLE VIII

Additional runs were carried out in the same manner as Example I employing N-methyl-N-propylnitrosamine and N,N-diethylnitrosamine in place of nitrosodimethylamine. The results obtained were on the same order as nitrosodimethylamine.

The N,N-disubstituted hydrazine product of the present invention finds application in a wide variety of fields, including use as a rocket and jet propellant, a gas absorbent, a plasticizer, a rubber vulcanizer and the like.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing N,N-disubstituted hydrazine by catalytic hydrogenation of a compound selected from the group consisting of N-dialkylnitrosamines having from 1 to 3 carbon atoms in each of said alkyl chains, and nitrosohexamethyleneimine with a palladium catalyst, and wherein undesirable overhydrogenation of said compound takes place to form side products, the improvement which comprises carrying out the catalytic hydrogenation in the presence of:
   (a) a soluble iron salt in amounts sufficient to provide about 0.1 to about 2 millimoles of iron per gram of catalyst, and
   (b) a cation selected from the group consisting of the alkali metals and the alkaline earth metals, and hydroxide ions in said solution of aliphatic nitrosamines being hydrogenated, said ions being present in the mole ratio of 2.5:1 to 50:1 of said soluble iron salt and in amounts of at least about 2.5 millimoles of hydroxide ion per gram of catalyst, whereby said undesirable overhydrogenation is materially reduced.

2. Process of claim 1 in which the soluble iron salt is ferrous sulfate and the cations and hydroxide ions are supplied by adding NaOH to said solution.

3. Process of claim 1 in which the N-dialkylnitrosamine is nitrosodimethylamine.

4. Process of claim 1 in which the compound being hydrogenated is N-nitrosohexamethyleneimine.

5. In the process of producing N,N-disubstituted hydrazine by catalytic hydrogenation of a compound selected from the group consisting of N-dialkylnitrosamines having from 1 to 3 carbon atoms in each of said alkyl chains, and nitrosohexamethyleneimine with a palladium catalyst, and wherein undesirable overhydrogenation of said compound takes place to form side products, the improvement which comprises carrying out the catalytic hydrogenation in the presence of:
   (a) a soluble iron salt in amounts sufficient to provide about 0.1 to about 2 millimoles of iron per gram of catalyst, and
   (b) a compound selected from the group consisting of alkali metal hydroxides and alkaline earth metal hydroxides, said compound being present in a mole ratio of 2.5:1 to 50:1 with respect to said soluble iron salt, and in amounts to provide at least about 2.5 millimoles of hydroxide ion per gram of catalyst, whereby said desirable overhydrogenation is materially reduced.

References Cited in the file of this patent

UNITED STATES PATENTS

| 2,802,031 | Horvitz | Aug. 6, 1957 |
| 2,979,505 | Tuemmler et al. | Apr. 11, 1961 |

OTHER REFERENCES

Audrieth: The Chemistry of Hydrazine (1951), p. 16.

UNITED STATES PATENT OFFICE
CERTIFICATE OF CORRECTION

Patent No. 3,154,538                    October 27, 1964

Daniel A. Lima

It is hereby certified that error appears in the above numbered patent requiring correction and that the said Letters Patent should read as corrected below.

Column 4, Table II, under the heading "Yield, Percent DMH", opposite Run 2, for "97.7" read -- 97.6 --; same column 4, above line 35, after Table III, insert the following:

EXAMPLE IV

Signed and sealed this 16th day of March 1965.

(SEAL)
Attest:

ERNEST W. SWIDER
Attesting Officer

EDWARD J. BRENNER
Commissioner of Patents